United States Patent
Conway et al.

(10) Patent No.: US 10,408,282 B2
(45) Date of Patent: Sep. 10, 2019

(54) WRAP SPRING TORQUE NIPPLE

(71) Applicant: Woodward, Inc., Fort Collins, CO (US)

(72) Inventors: George Conway, Moorpark, CA (US); Rameil Jacob, West Hills, CA (US)

(73) Assignee: Woodward, Inc., Fort Collins, CO (US)

(*) Notice: Subject to any disclaimer, the term of this patent is extended or adjusted under 35 U.S.C. 154(b) by 167 days.

(21) Appl. No.: 15/803,399

(22) Filed: Nov. 3, 2017

(65) Prior Publication Data
US 2019/0136917 A1    May 9, 2019

(51) Int. Cl.

| | |
|---|---|
| *F16D 41/20* | (2006.01) |
| *F02B 67/04* | (2006.01) |
| *F16D 13/12* | (2006.01) |
| *F16D 27/105* | (2006.01) |
| *F16F 15/129* | (2006.01) |
| *F16D 3/74* | (2006.01) |
| *F16D 7/02* | (2006.01) |

(Continued)

(52) U.S. Cl.
CPC ............ *F16D 41/206* (2013.01); *F02B 67/04* (2013.01); *F16D 3/74* (2013.01); *F16D 7/022* (2013.01); *F16D 13/12* (2013.01); *F16D 27/105* (2013.01); *F16F 15/1297* (2013.01); *B60K 25/02* (2013.01); *F16D 43/211* (2013.01); *F16D 2500/70426* (2013.01)

(58) Field of Classification Search
CPC ...... F16D 41/20; F16D 41/203; F16D 41/206; F16D 7/02; F16D 7/022; F16D 3/74; F16D 27/105; F16D 13/12; F16F 15/1297; F02B 67/04
See application file for complete search history.

(56) References Cited

U.S. PATENT DOCUMENTS 1,987,316 A * 1/1935 Zimmer ............... F16C 1/02
                                               267/155
2,242,379 A * 5/1941 Wahl ................. F16D 3/72
                                               192/81 C (Continued)

FOREIGN PATENT DOCUMENTS

JP        S517552        1/1976

OTHER PUBLICATIONS

Helical Products Company, MW Industries, Inc., Flexible Couplings Product Sheet, captured from website: http://heli-cal.com/products/product-overview/flexible-couplings, Downloaded on Nov. 3, 2017 3:22:19 PM, 3 pages.

(Continued)

*Primary Examiner* — Jacob S. Scott
*Assistant Examiner* — Lori Wu
(74) *Attorney, Agent, or Firm* — McAndrews, Held & Malloy, Ltd.

(57) ABSTRACT

The present disclosure describes a wrap spring torque nipple that includes a first helical spring, a second helical spring, and a middle portion connected to and between the first helical spring and the second helical spring. The first helical spring and the second helical spring have different rotational helix orientations, and the first helical spring is configured to receive an input shaft and the second helical spring is configured to receive an output shaft, wherein the wrap spring transfers rotational power up to a defined torsional value from the input shaft to the output shaft.

13 Claims, 7 Drawing Sheets

(51) Int. Cl.
*B60K 25/02* (2006.01)
*F16D 43/21* (2006.01)

(56) References Cited

U.S. PATENT DOCUMENTS

| | | | |
|---|---|---|---|
| 2,991,637 A | | 7/1961 | Lochow |
| 3,537,275 A | | 11/1970 | Smith |
| 3,727,732 A | * | 4/1973 | Barr ..................... F16D 13/025 188/77 W |
| 4,527,683 A | * | 7/1985 | Mathews ................ F16D 7/022 188/71.9 |
| 8,387,767 B2 | | 3/2013 | Komorowski et al. |
| 8,485,331 B2 | | 7/2013 | Parsons et al. |
| 8,851,258 B2 | | 10/2014 | Komorowski et al. |
| 9,556,918 B2 | | 1/2017 | Staniewicz et al. |
| 2018/0303636 A1 | * | 10/2018 | Pomeroy .................. A61F 2/64 |

OTHER PUBLICATIONS

International Searching Authority, Notification of Transmittal of the International Search Report and the Written Opinion of the International Searching Authority, or the Declaration, dated Nov. 16, 2018, 14 pages.

\* cited by examiner

WRAP SPRING TORQUE NIPPLE

BACKGROUND OF THE INVENTION

Many mechanical and motorized devices include mechanical rotary drive shafts or torque transmission components that are used to transmit torque and rotation between adjacent or inline components of a drive train. These motors, shafts, couplings and drive line components are potentially subjected to torque loads that are higher than the intended normal or maximum operating torque for a given purpose. These higher torque loads can come from rapid acceleration or deceleration events or an internal source such as a decrease of mechanical efficiency downstream due to contamination, wear, or misalignment. The torque increase may also come from an external overload or an improper or failed connection of the drive components. Torque overload can exceed the safe design limits of the device and cause damage and/or reduce the lifespan of the drive components and cause the device to malfunction.

Conventional wrap springs have traditionally been used to protect against torsional overload in a singular direction when a drive source, like a motor or manual input drive device, produces too much torque due to a gradual or sudden increase of drive torque resistance. A conventional unidirectional wrap spring is basically a helical spring with an input shaft (which is connected to a drive source) interference fitted into one end of the spring, and an output shaft (which is connected to a driven component) interference fitted into the opposite end of the spring. The outer diameters of the shafts and the inner diameter of the spring are specified and controlled to provide a specified interference fit when assembled. When the input shaft is torqued, the friction along the interference fit causes the coils to reduce the grip, and when the torque value increases to a balanced friction fit, the wrap spring releases the input shaft (i.e., allows the input shaft to torsionally "slip"). For example, assuming the wrap spring is a right hand helix and the input shaft rotates in a clockwise direction, when the torque from the input shaft exceeds the threshold amount in the clockwise direction, the helix feature is torqued in the unwind direction causing the wrapped coils to expand and release the input shaft, and thus avoid torsion overload of the drive shaft system. As this input torque is reduced, the spring forces once again clamp down to the original condition. The unidirectional wrap spring only releases when the torque exceeds the predetermined amount in a single direction, e.g., the clockwise direction.

Conventional bidirectional wrap spring designs exist that protect against torsional overload in both rotational directions. They differ from unidirectional wrap springs in that the opposite end of the spring is interference fitted along the outside diameter into a cylindrical feature added to the output shaft. Thus, when the input shaft reaches a threshold torque in the counter-clockwise direction, the wrap spring holds tightly to the input shaft but reduces the compressive radial friction grip with respect to the inner diameter of the output shaft cylindrical feature. This allows slip between the outside of the spring and the output shaft. These conventional bidirectional wrap springs, however, require machining inside and outside component diameters to have very close tolerances to provide the required interference fits. It is difficult to machine the parts such that the interference fit torsional slipping is balanced in both rotational directions. Bidirectional wrap springs also require more complicated componentry than unidirectional wrap springs. Moreover, the coupling connection between the output shaft cylindrical feature and the spring in a bidirectional wrap spring takes up more space and weighs more than the connection between the output shaft and the spring in a unidirectional wrap spring.

SUMMARY OF THE INVENTION

Certain aspects of the present technology provide a wrap spring that includes a first helical spring, a second helical spring, and a middle portion connected to and between the first helical spring and the second helical spring. The first helical spring and the second helical spring have different rotational helix orientations, and the first helical spring is configured to receive an input shaft within its inside diameter and the second helical spring is configured to receive an output shaft within its inside diameter, wherein the wrap spring transfers rotational power from the input shaft to the output shaft.

In some embodiments, the first helical spring is configured to have the input shaft interference fitted inside the first helical spring such that, upon the input shaft providing a torque load over a first threshold level in a first rotational direction, coils of the first helical spring to reduce the clamp force and permit slippage between the coils and the drive input shaft. In some embodiments, the second helical spring is configured to have the output shaft interference fitted inside the second helical spring such that, upon the input shaft providing a torque load over a second threshold level in a second rotational direction, coils of the second helical spring to reduce the clamp force and permit slippage between the coils and the output shaft.

In some embodiments, the first and second threshold levels can be generally the same and, in others, the first and second threshold levels are different. The first helical spring can be a clockwise helix, and the second helical spring can be a counter-clockwise helix. Alternatively, the first helical spring can be a counter-clockwise helix, and the second helical spring can be a clockwise helix. The first helical spring can be a single or multiple start helical coil, and the second helical spring can also be a single or multiple start helical coil.

In some embodiments, the middle portion of the wrap spring torque nipple includes sets of centralized holes that lead into grooves along a bore of the middle portion that align with grooves at the end of the input and output shafts. The grooves and holes are configured to receive lock wires that secure the input and output shafts axially to the spring. The wrap spring can include a cover that holds the lock wires to the spring.

Certain aspects of the present technology provide a wrap spring that includes a first helical spring, a second helical spring, and a middle portion integrally formed with and between the first helical spring and the second helical spring. The first helical spring and the second helical spring have different rotational helix orientations, and the first helical spring is configured to have an input shaft interference fitted inside the first helical spring and the second helical spring is configured to have an output shaft interference fitted inside the second helical spring. The wrap spring transfers rotational power from the input shaft to the output shaft, wherein the first helical spring, under a set torque, reduces the radial clamp force of the interference fit to permit slippage between the first helical spring and the input shaft when the input shaft transmits a torque load over a first threshold level in a first rotational direction, and the second helical spring, under a set torque, reduces the radial clamp force of the interference fit to permit slippage between the second helical spring and the output shaft when the input shaft transmits a torque load over a second threshold level in a second rotational direction.

Certain aspects of the present technology provide a wrap spring that includes a first helical spring that includes at least one coil, a second helical spring that includes at least one coil, and a middle portion integrally formed with and between the first helical spring and the second helical spring. The first helical spring and the second helical spring have different rotational helix orientations, and the first helical spring is configured to have an input shaft interference fitted inside the first helical spring and the second helical spring is configured to have an output shaft interference fitted inside the second helical spring. The wrap spring transfers rotational power from the input shaft to the output shaft. The first helical spring reduces the radial clamping force of the interference fit to permit slippage between the first helical spring and the input shaft when the input shaft transmits a torque load over a first threshold level in a first rotational direction, and the second helical spring reduces the radial clamping force of the interference fit to permit slippage between the second helical spring and the output shaft when the input shaft transmits a torque load over a second threshold level in a second rotational direction.

DETAILED DESCRIPTION OF THE INVENTION

Figure 1:
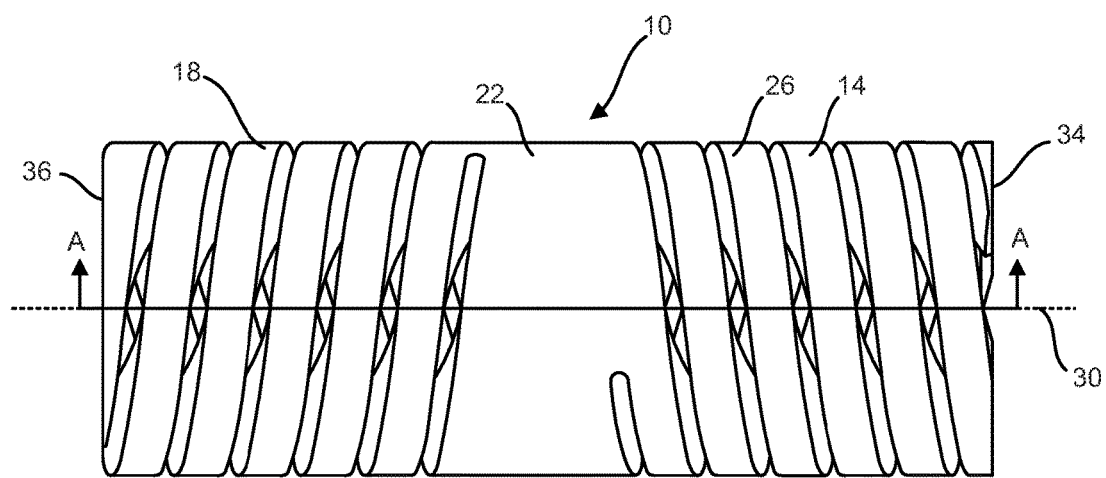
FIG. 1 illustrates a top view of a wrap spring torque nipple according to an embodiment of the present technology.
Figure 2:
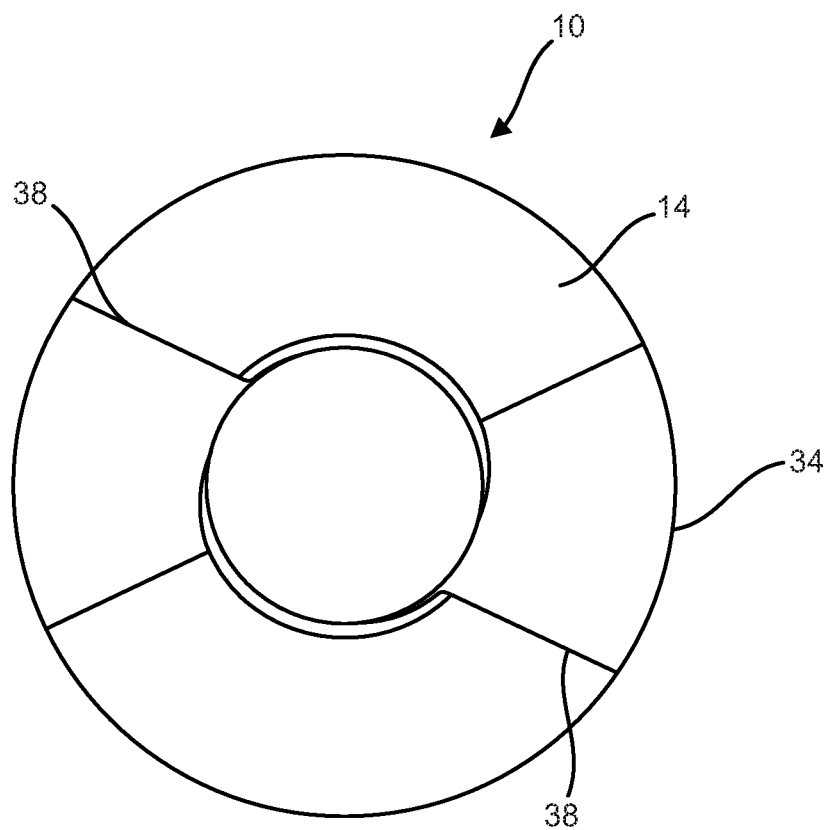
FIG. 2 illustrates a side view of the wrap spring torque nipple of FIG. 1.

FIG. 1 illustrates a top view of a wrap spring torque nipple 10 according to an embodiment of the present technology, and FIG. 2 illustrates a side view of the wrap spring torque nipple 10. The nipple 10 is generally cylindrical in shape and includes a first helical spring 14 and a second helical spring 18 connected to each other by a center solid torque drive section 22. The springs 14 and 18 may be machined on each side of a solid tube section to create the nipple 10. The springs 14 and 18 each include multiple parallel helixed turns or tines 26 that are oriented at a particular helix angle with respect to a longitudinal axis 30 and each includes flat ends 34 and 36. The springs 14 and 18 are oppositely oriented. That is to say, the first spring 14 may be a clockwise (or right hand) helical spring and the second spring 18 may be a counterclockwise (or left hand) helical spring, or vice versa. Each spring 14 and 18 may be a single or multiple start (or coil) helix spring. By way of example, the springs 14 and 18 of the torque nipple 10 shown are double start (or coil) helical springs. In that regard, as shown in FIG. 2, the end 34 of the first spring 14 is shown to have two turn ends 38. The turns 26 at each end 34 and 36 of the springs 14 and 18 are machined flat so that the ends 34 and 36 of the nipple 10 are generally flat and parallel.

Figure 3:
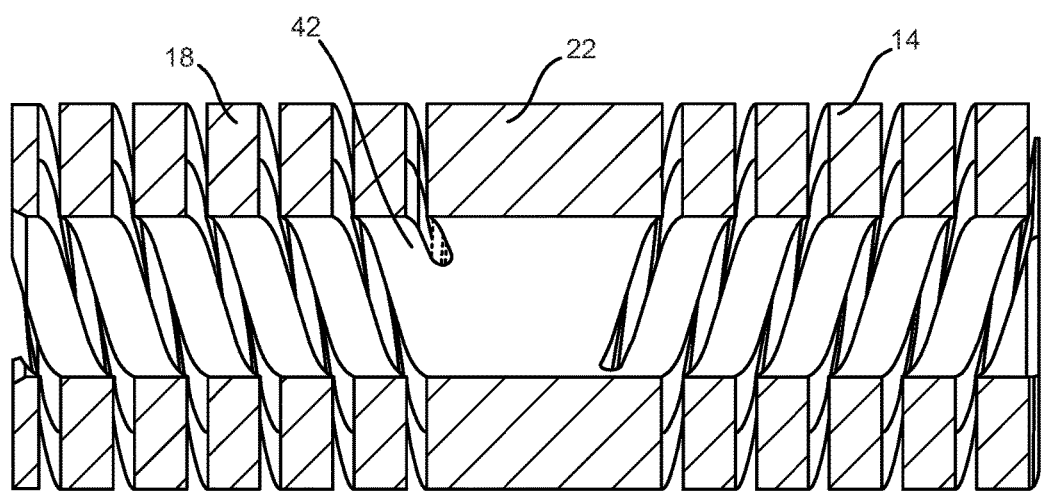
FIG. 3 illustrates a cross-sectional front view of the nipple of FIG. 1.

FIG. 3 illustrates a cross-sectional view of FIG. 1 taken along lines A-A. The first and second springs 14 and 18 and the center section 22 define a bore 42 having a generally consistent inner diameter. The portion of the bore 42 defined by the first spring 14 is configured to be interference fitted about the outer diameter of an input shaft connected to a drive source. The portion of the bore 42 defined by the second spring 18 is configured to be interference fitted about the outer diameter of an output shaft connected to a driven component.

The torque nipple 10 may be made of stainless steel aluminum, carbon steel, beryllium copper, plastic, or any number of other materials having properties suitable for a particular application.

Figure 4:
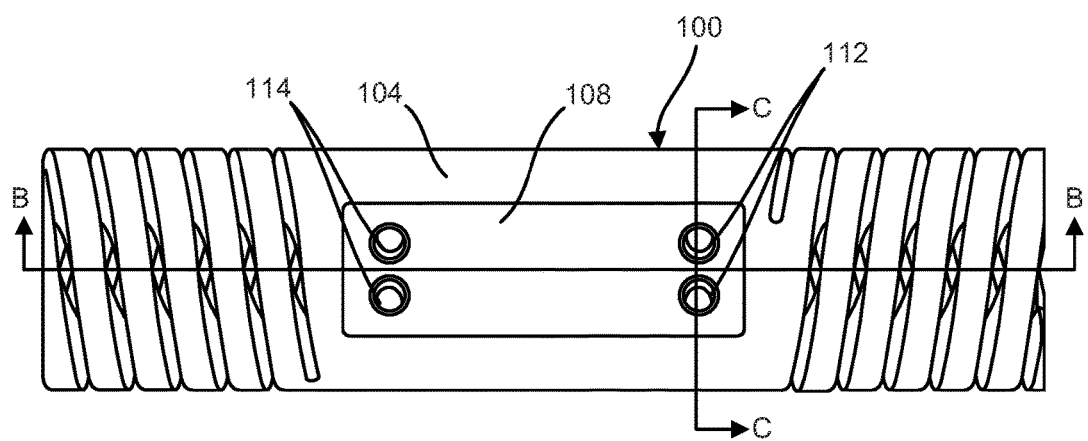
FIG. 4 illustrates a top view of a wrap spring torque nipple according to an embodiment of the present technology.

FIG. 4 illustrates another embodiment of the wrap spring torque nipple 100. It is similar to the torque nipple 10 shown in FIGS. 1-3 except that it has a different center portion 104. The center portion 104 is longer than the center portion 22 of the nipple 10 of FIGS. 1-3. It also includes a flat recess 108 along a portion of the top thereof. The recess 108 includes a first pair of holes 112 and second pair of holes 114. The holes 112 are configured to receive a first lock wire, and the holes 114 are configured to receive a second lock wire.

Figure 5:
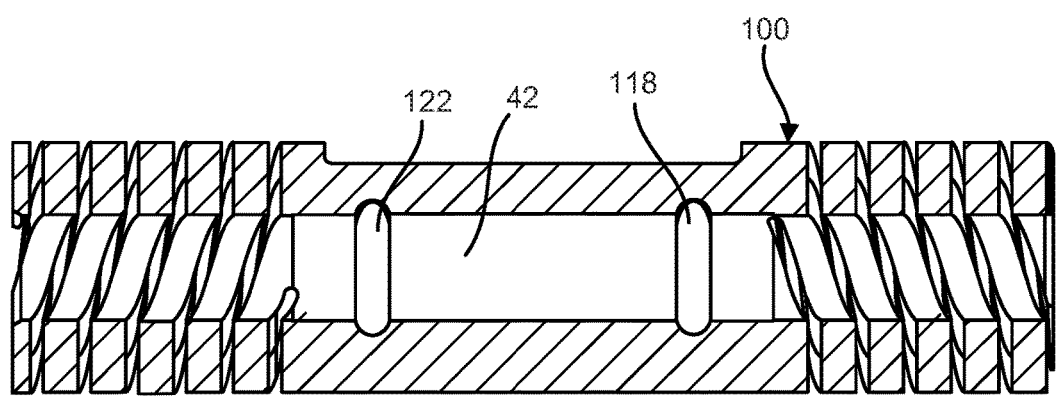
FIG. 5 illustrates a cross-sectional front view of the nipple of FIG. 4.

FIG. 5 illustrates a cross-sectional front view of the torque nipple 100 of FIG. 4 taken along lines B-B. The bore 42 of the center portion 104 has two parallel grooves 118 and 122. The first groove 118 is aligned with the first pair of holes 112 (FIG. 4), and the second groove 122 is aligned with the second pair of holes 114 (FIG. 4). The grooves 118 and 122 are configured to align with grooves on input and output shafts, respectively, inserted in the nipple 100 and receive a portion of the first and second lock wires, respectively.

Figure 6:
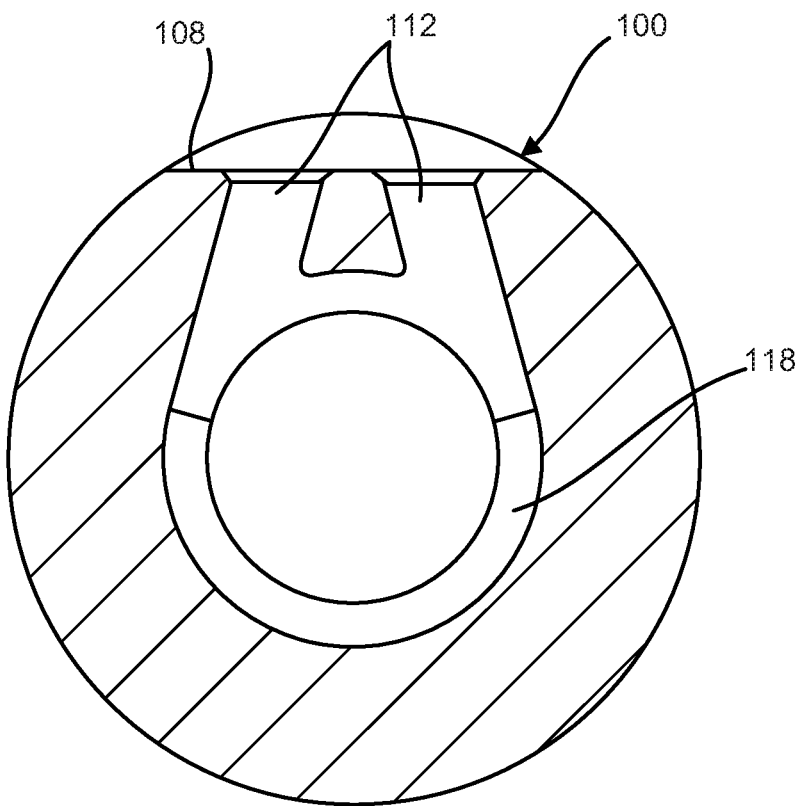
FIG. 6 illustrates a cross-sectional side view of the nipple of FIG. 4.

FIG. 6 illustrates a cross-sectional side view of the nipple 100 of FIG. 4 taken along lines C-C. The holes 112 extend downward from the recess 108 and align with and lead to the groove 118. Similarly, though not shown in FIG. 6, the holes 114 (FIG. 4) also extend downward from the recess 108 and align with and lead to the groove 122 (FIG. 5).

Figure 7:
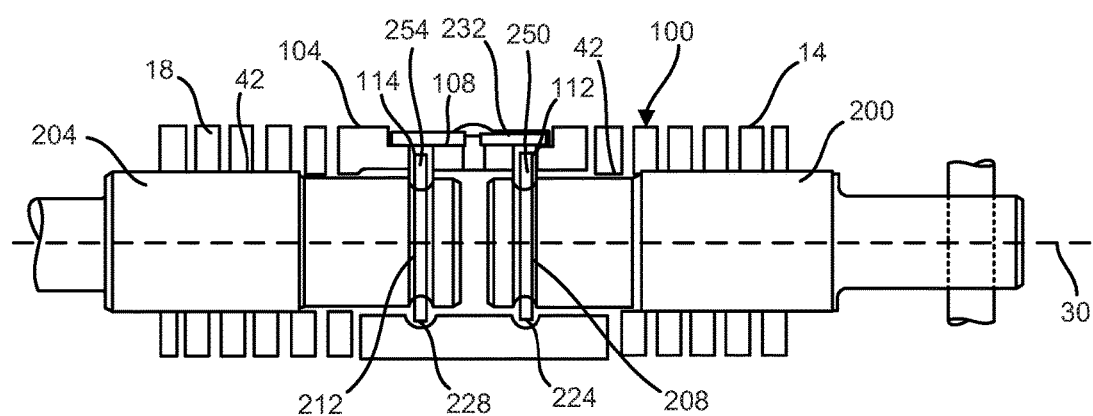
FIG. 7 illustrates a cross-sectional front view of the torque nipple of FIG. 4 and side views of an assembled and axially locked input shaft and output shaft.

FIG. 7 illustrates a cross-sectional front view of the nipple 100 of FIGS. 4-6 connected to an input shaft 200 and an output shaft 204. The first input shaft 200 is connected to a drive source (not shown), and the output shaft 204 is connected to a driven component (not shown). The first input shaft 200 has been interference fitted into the bore 42 of the first spring 14. The first input shaft 200 includes a groove 208 extending around the circumference thereof. The first input shaft 200 is fitted into the first spring 14 such that the groove 208 of the shaft 200 is aligned with the groove 118 (FIG. 5) of the center portion 104 to define a first annular channel 224. Similarly, the second input shaft 204 has been interference fitted into the bore 42 of the second spring 18. The second input shaft 204 includes a groove 212 extending around the circumference thereof. The second input shaft 204 is fitted into the second spring 18 such that the groove 212 of the shaft 204 is aligned with the groove 122 (FIG. 5) of the center portion 104 to define an annular channel 228. By connecting the input shaft 200 and the output shaft 204 with the torque nipple 100, torque force up to a defined limit applied by the drive source can be transmitted to the output shaft 204 and driven component as part of a drive train.

In order to prevent either shafts 200 and 204 from moving axially along the longitudinal axis 30 during operation of the drive shaft, a first lock wire 250 is fed through one of the holes 112 into the first annular channel 224 and out the other hole 112 and a second lock wire 254 is fed through one of holes 114 into the second annular channel 228 and out the other hole 114. A lock wire cover 232 may then be secured on top of the lock wires 250 and 254 to the recess 108 on the top of the nipple 100. The cover 232 may be secured to the nipple 100 by a screw or any number of other kinds of fasteners. The cover 232 holds the lock wires 250 and 254 in place. The secured lock wires 250 and 254 serve to prevent or limit axial movement of the nipple 100 and the input shaft 200 with respect to each other along the longitudinal axis 30 and to prevent or limit axial movement of the nipple 100 and the output shaft 204 with respect to each other along the longitudinal axis 30, while still allowing the input shaft 200 or the output shaft 204 to spin with respect to the torque nipple 100 in instances when an input torque exceeds a threshold, as described further below.

Besides serving as a connection between the input and output shafts 200 and 204, the torque nipple 100 provides torque overload protection in both rotational directions. For example, when the input shaft 200 is driven by the drive source in the clockwise direction, the connection between the input shaft 200 and the output shaft 204 provided by the torque nipple 100 allows for the output shaft 204 to likewise be driven in the clockwise direction. The tolerances of the outer diameter of the input shaft 200 and the inner diameter of the first (clockwise) spring 14 are such that, at a predetermined threshold level of torque delivered by the input shaft 200 and opposed by the output shaft 204, the inner diameter of the first spring 14 reduces the radial clamping force, and, thus, the first spring 14 slips with respect to the input shaft 104 such that torque above the threshold value is not transmitted to the output shaft 204 via the nipple 100. In this way, the torque nipple 100 prevents torque overload of the input shaft 200 and output shaft 204 in the clockwise direction.

Alternatively, when the input shaft 200 is driven by the drive source in the counter-clockwise direction, the connection between the input shaft 200 and the output shaft 204 provided by the nipple 100 allows for the output shaft 204 to likewise be driven in the counter-clockwise direction. The tolerances of the outer diameter of the output shaft 204 and the inner diameter of the second (counter-clockwise) spring 18 are such that, at a predetermined threshold level of torque delivered by the input shaft 200 and opposed by the output shaft 204 in the counter-clockwise direction, the inner diameter of the second spring 18 reduces the radial clamping force (because the second spring 18 is a counter-clockwise spring). The reduced clamping force of the second spring 18 allows for slip between the second spring 18 and the output shaft 204 such that torque above the threshold value is not transmitted to the output shaft 204 via the nipple 100. In this way, the nipple 100 prevents torque overload of the output shaft 204 and input shaft 200 in the counter-clockwise direction. It will be understood that the torque limiting slip value for the clockwise direction may be sized for a different torque limiting slip value than for the counter-clockwise direction, i.e., the first spring 14 may be configured to slip with respect to the input shaft 200 at a first clockwise torque load and the second spring 18 may be configured to slip with respect to the output shaft 204 at a second counter-clockwise torque load.

It is understood that the torque nipple 10 shown in FIGS. 1-3 operates in the same way as the torque nipple 100 shown in FIGS. 4-7 to provide bidirectional torque limiting protection—it just does not include the lock wire axial restraint system.

The different wrap spring torque nipple embodiments can be used to protect against torque overloading in numerous applications, such as pneumatic, hydraulic, or electric motors as well as manual drive input for either drive direction. It may be used as an over-running device and as a rigging aid to limit load impulses or the need to provide large components to handle potentially higher failure case loads. It can be scaled to provide torque overload protection for large stationary power generators, to drive heavy mobile equipment, and to protect aerospace primary, secondary, and trim surface systems. It can be used in low torque instrument drive systems to protect the instrumentation from damaging over loads like in thrust reversal actuation systems, self-adjusting linear variable displacement transducers, manual drive clutches, and electro mechanical drive clutches. The torque nipple can also be used in industrial mechanical drive usages such as utility actuators, rotary actuators, and rotary solenoids.

The wrap spring torque nipple of the different embodiments provides significant advantages over existing wrap springs. It provides bidirectional torque limiting slip protection (and independent torque limiting slip values for each rotational direction), but is smaller (both in length and in profile), weighs less, and includes fewer parts than existing bi-directional wrap spring arrangements. It also does not require machining of both the inner diameter of the spring (to provide an interference fit with outer diameter of the input shaft) and the outer diameter of the spring (to provide an interference fit with the inner diameter of a cylindrical feature on the output shaft). The nipple can be machined instead of wound, which reduces the likelihood of input and output shaft misalignment and improves dimensional control. Moreover, for a torque nipple that includes multiple start helical springs (e.g., each end includes two or more coils), if one coil in the helix fails, the adjacent one or more coils in the helix will trap the failed coil in place and thus maintain the torsional slip value provided by the helix. A multiple start helix also allows for increased internal diameter tolerances for a given slip value range because the length of each coil is reduced as more than one coil is incorporated into the helix. Moreover, if the nipple shears at the junction to the center section, the nipple will stay in place because each helical spring will remain connected to its associated shaft. In this way, the device helps prevent foreign objects getting loose into the device's cavity. Furthermore, due to the limited deflection needed to relieve the interference fit under torque overload, many materials may be used to make the torque nipple such as steel, aluminum, bronze, plastic, etc. The nipple also does not require electronics to monitor the torque, strain, or motive electrical current of the drive system.

While endeavoring in the foregoing specification to draw attention to those features of the invention believed to be of particular importance it should be understood that the Applicant claims protection in respect of any patentable feature or combination of features herein before referred to and/or shown in the drawings whether or not particular emphasis has been placed thereon. In addition, while particular elements, embodiments and applications of the present invention have been shown and described, it will be understood that the invention is not limited thereto since modifications can be made by those skilled in the art without departing from the scope of the present disclosure, particularly in light of the foregoing teachings.

The invention claimed is:

1. A wrap spring, comprising:
a first helical spring;

a second helical spring;

a middle portion connected to and between the first helical spring and the second helical spring;

wherein the first helical spring and the second helical spring have different rotational helix orientations, and wherein the first helical spring is configured to receive an input shaft, and the second helical spring is configured to receive an output shaft, wherein the wrap spring transfers rotational power from the input shaft to the output shaft; and wherein the middle portion includes holes that lead into grooves along a bore of the middle portion and wherein the grooves and holes are configured to receive lock wires that secure the input and output shafts axially to the middle portion.

2. The wrap spring of claim 1, wherein the first helical spring is configured to have the input shaft interference fitted inside the first helical spring such that, upon the input shaft providing a torque load over a first threshold level in a first rotational direction, coils of the first helical spring reduce a clamping force on the input shaft to permit slippage between the coils and the input shaft.

3. The wrap spring of claim 2, wherein the second helical spring is configured to have the output shaft interference fitted inside the second helical spring such that, upon the input shaft providing a torque load over a second threshold level in a second rotational direction, coils of the second helical spring reduces a clamping force on the output shaft to permit slippage between the coils and the output shaft.

4. The wrap spring of claim 3, wherein the first and second threshold levels are generally the same.

5. The wrap spring of claim 3, wherein the first and second threshold levels are different.

6. The wrap spring of claim 1, wherein the first helical spring is a clockwise spring and the second helical spring is a counter clockwise spring.

7. The wrap spring of claim 1, wherein the first helical spring is a counter clockwise spring and the second helical spring is a clockwise spring.

8. The wrap spring of claim 1, further including a cover that holds the lock wires to the middle portion.

9. A wrap spring, comprising:

a first helical spring;

a second helical spring;

a middle portion integrally formed with and between the first helical spring and the second helical spring;

wherein the first helical spring and the second helical spring have different rotational orientations, and wherein the first helical spring is configured to have an input shaft interference fitted inside the first helical spring and the second helical spring is configured to have an output shaft interference fitted inside the second helical spring, wherein the wrap spring transfers rotational power from the input shaft to the output shaft, wherein the first helical spring reduces a radial clamping force to permit slippage between the first helical spring and the input shaft when the input shaft transmits a torque load over a first threshold level in a first rotational direction, and the second helical spring reduces a radial clamping force to permit slippage between the second helical spring and the output shaft when the input shaft transmits a torque load over a second threshold level in a second rotational direction, and wherein the middle portion includes holes that lead into grooves along a bore of the middle portion and wherein the grooves and holes are configured to receive lock wires that secure the input and output shafts to the spring.

10. The wrap spring of claim 9, wherein the first and second threshold levels are generally the same.

11. The wrap spring of claim 9, wherein the first and second threshold levels are different.

12. The wrap spring of claim 9, wherein the first helical spring is a clockwise spring and the second helical spring is a counter clockwise spring.

13. The wrap spring of claim 9, wherein the first helical spring is a counter clockwise spring and the second helical spring is a clockwise spring.

* * * * *